United States Patent Office 2,753,259
Patented July 3, 1956

2,753,259

PROCESSING OF NICKEL-COPPER MATTES

Leo Schlecht and Helmut Schlecht, Ludwigshafen (Rhine), Germany, assignors to Badische Anilin- & Soda-Fabrik Aktiengesellschaft, Ludwigshafen (Rhine), Germany No Drawing. Application November 7, 1951, Serial No. 255,329

Claims priority, application Germany November 18, 1950

4 Claims. (Cl. 75—119)

This invention relates to improvements in the working up of nickel-copper mattes.

It is already known that from nickel-copper mattes, which have preferably previously been subjected to an annealing treatment, there can be recovered by comminution and a mechanical separation, such as sieving, elutriation, flotation or magnetic separation, a fraction predominantly consisting of copper sulfide and a fraction containing mainly nickel sulfide. If the sulfur content of the nickel-copper matte is not sufficient for completely binding the nickel and copper as sulfides, then a third fraction is obtained by the mechanical separation and this consists mainly or wholly of metallic nickel and copper. This metallic fraction may most simply be separated from the sulfidic fractions by magnetic treatment of the comminuted matte. Since said fraction contains nickel as well as coper and these two metals are present as an alloy the separation of the nickel from the copper in this metallic fraction has hitherto offered considerable difficulty. Thus it has been proposed to smelt this nickel-copper fraction with green furnace matte in order to convert the nickel and copper metals into nickel sulfide and copper sulfide because these sulfides may be separated from each other relatively easily by annealing, comminution and flotation.

We have now found that the above-mentioned fraction containing metallic nickel and copper can be processed in a simple manner by treating it with nickel-dissolving agents, such as acids or salt solutions. The surprising fact has been established that whereas nickel-copper alloys, such as Monel metal, are known to be very stable to acids or salt solutions and dissolution of the nickel from such alloys is therefore out of the question in practice, the nickel contained in the said metallic fraction goes into solution much more rapidly. It is preferable to employ sulfuric acid as the solvent; the nickel is then recovered in the form of nickel sulfate, which is much used in industry, but any other acid capable of dissolving nickel, such as hydrochloric acid, nitric acid or organic acids, may be used. The desired result is also obtained with salt solutions which are capable of dissolving nickel metal, such as copper sulfate solutions.

The treatment is preferably continued until the whole of the nickel contained in the metallic fraction has passed into solution. In most cases a little copper also passes into solution under these circumstances. The copper salt thus formed may be separated in a simple manner from the nickel salt solution, however, by treating the solution with a further amount of the metallic fraction containing nickel and copper, whereupon the metallic nickel precipitates the copper present in the solution as metal powder. The nickel metal contained in the metallic fraction exerts a remarkably good precipitating action on copper salts.

It is preferable to start with a nickel-copper matte containing about 20% of sulfur such as is formed in the usual way by blowing nickel-copper green matte in a converter with slagging of the iron. If it is desired to increase the metallic fraction during the mechanical processing of the matte, however, the sulfur content of the nickel-copper matte is reduced below 20%. The amount of the metallic fraction can be reduced in a corresponding way by increasing the sulfur content. It is thus possible to recover a larger or smaller proportion of the nickel from the matte in the form of nickel salt according to this invention at will.

The process is of special advantage when a nickel-copper matte containing noble metals is to be processed because the noble metals become enriched in the copper residue obtained according to the process. This enrichment can be further enhanced by employing a matte which contains but little copper in proportion to nickel and of which the sulfur content has been adjusted so that only a small amount of the metallic fraction is obtained by the mechanical separation.

The employment of sulfuric acid as solvent for the nickel offers the advantage that nickel metal can be recovered from the nickel salt by electrolysis and the sulfuric acid thus formed anodically may be used again for dissolving out further amounts of nickel from the metallic fraction.

Since the resulting nickel salt solutions become free from copper by the aftertreatment with fresh metallic fraction, they may be worked up in a simple manner into pure crystalline nickel salts.

The metallic fraction may also be used for purifying nickel salt solutions obtained in other ways because it exerts a good precipitating action on the salts of all metals which are nobler than nickel.

The following examples will further illustrate this invention but the invention is not restricted to these examples.

Example 1

Nickel-copper matte containing 54% of nickel, 26% of copper and 20% of sulfur is heated for 72 hours at 500° C. and then comminuted so finely that no residue remains on a sieve having 4900 meshes per square centimetre. The magnetic fraction is then separated by a magnet. The separated fraction, which contains 71% of nickel, 28% of copper and only small amounts of sulfur is treated hot with a sulfuric acid of 20% strength, whereby 90% of the nickel and 10% of the copper pass into solution. The thus obtained copper-containing nickel sulfate solution, which is still acid, is treated with a fresh amount of the said magnetic fraction while hot until copper is no longer detectable in the nickel sulfate solution. After filtering off the residue, the copper-free nickel sulfate solution is worked up into pure crystallised nickel sulfate or used as electrolyte for the cathodic separation of electrolytic nickel.

The copper residue is treated with further amounts of acid until it is free from nickel. The copper-containing nickel salt solution thus obtained is treated with further amounts of the said magnetic fraction until all the copper has been precipitated. In this way, besides the pure nickel sulfate solution, there is obtained a residue which, apart from small amounts of sulfur, contains only metallic copper and can therefore be worked up in a simple manner into electrolytic copper.

Example 2

A solution which contains 100 grams of nickel sulfate and 10 grams of copper sulfate per litre, in addition to about 1% of free sulfuric acid, is heated for an hour with the magnetic fraction specified in Example 1. In this way the whole of the copper contained in the solution is precipitated as metal on the particles of the introduced magnetic fraction. After filtering off the residue, copper is no longer analytically detectable in the clear nickel sulfate solution. This pure nickel sulfate solu-

What we claim is:

1. The process for working up nickel-copper matte containing an amount of sulfur insufficient for binding the total content of nickel and copper in the form of sulfides which comprises the steps of thermally treating the matte under conditions forming as a component of the resultant mixture an alloy composed substantially entirely of nickel and copper and containing about 71% of nickel and about 28% of copper, comminuting the treated matte to produce a pulverulent mixture of nickel and copper sulfides and a metallic fraction consisting substantially entirely of said alloyed metallic nickel and metallic copper, mechanically separating the said metallic fraction from the remainder of the mixture, and recovering the nickel from the said metallic fraction by treating the latter with a nickel-dissolving acid.

2. The process for working up nickel-copper matte containing an amount of sulfur insufficient for binding the total content of nickel and copper in the form of sulfides which comprises the steps of thermally treating the matte under conditions forming as a component of the resultant mixture an alloy composed substantially entirely of nickel and copper and containing about 71% of nickel and about 28% of copper, comminuting the treated matte to produce a pulverulent mixture of nickel and copper sulfides and a metallic fraction consisting substantially entirely of said alloyed metallic nickel and metallic copper, mechanically separating the said metallic fraction from the remainder of the mixture, and recovering the nickel from the said metallic fraction by treating the latter with sulfuric acid.

3. The process for working up nickel-copper matte containing an amount of sulfur insufficient for binding the total content of nickel and copper in the form of sulfides which comprises the steps of thermally treating the matte under conditions forming as a component of the resultant mixture an alloy composed substantially entirely of nickel and copper and containing about 71% of nickel and about 28% of copper, comminuting the treated matte to produce a pulverulent mixture of nickel and copper sulfides and a metallic fraction consisting substantially entirely of said alloyed metallic nickel and metallic copper, mechanically separating the said metallic fraction from the remainder of the mixture, and recovering the nickel from the said metallic fraction by treating the latter with a nickel-dissolving salt solution.

4. A process for working up nickel-copper matte containing an amount of sulfur insufficient for binding the total content of nickel and copper in the form of sulfides which comprises the steps of thermally treating the matte under conditions forming as a component of the resultant mixture an alloy composed substantially entirely of nickel and copper and containing about 71% of nickel and about 28% of copper, comminuting the treated matte to produce a pulverulent mixture of nickel and copper sulfides and a metallic fraction consisting substantially entirely of said alloyed metallic nickel and metallic copper, mechanically separating the said metallic fraction from the remainder of the mixture, and recovering the nickel from the said fraction by treating said fraction with a nickel-dissolving agent from the group consisting of nickel-dissolving acids and nickel-dissolving salt solutions.

References Cited in the file of this patent

UNITED STATES PATENTS

| | | |
|---|---|---|
| 1,266,775 | Dhavernas | May 21, 1918 |
| 2,223,239 | Hamprecht et al. | Nov. 26, 1940 |
| 2,239,626 | Schlecht et al. | Apr. 22, 1941 |
| 2,419,973 | Sproule et al. | May 6, 1947 |

OTHER REFERENCES

Hodgman, C. D. (Editor): "Handbook of Chemistry and Physics," Chemical Rubber Publishing Co., Cleveland, Ohio (1944), 28th edition, pages 1380–1381.